UNITED STATES PATENT OFFICE.

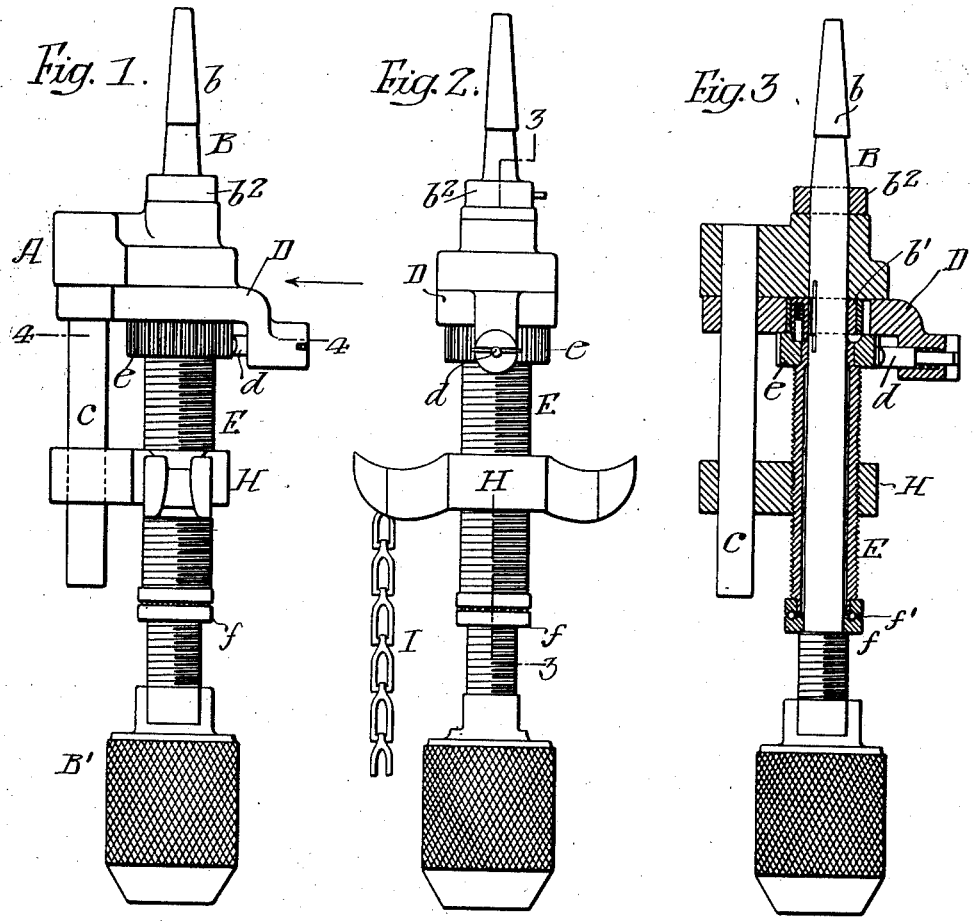

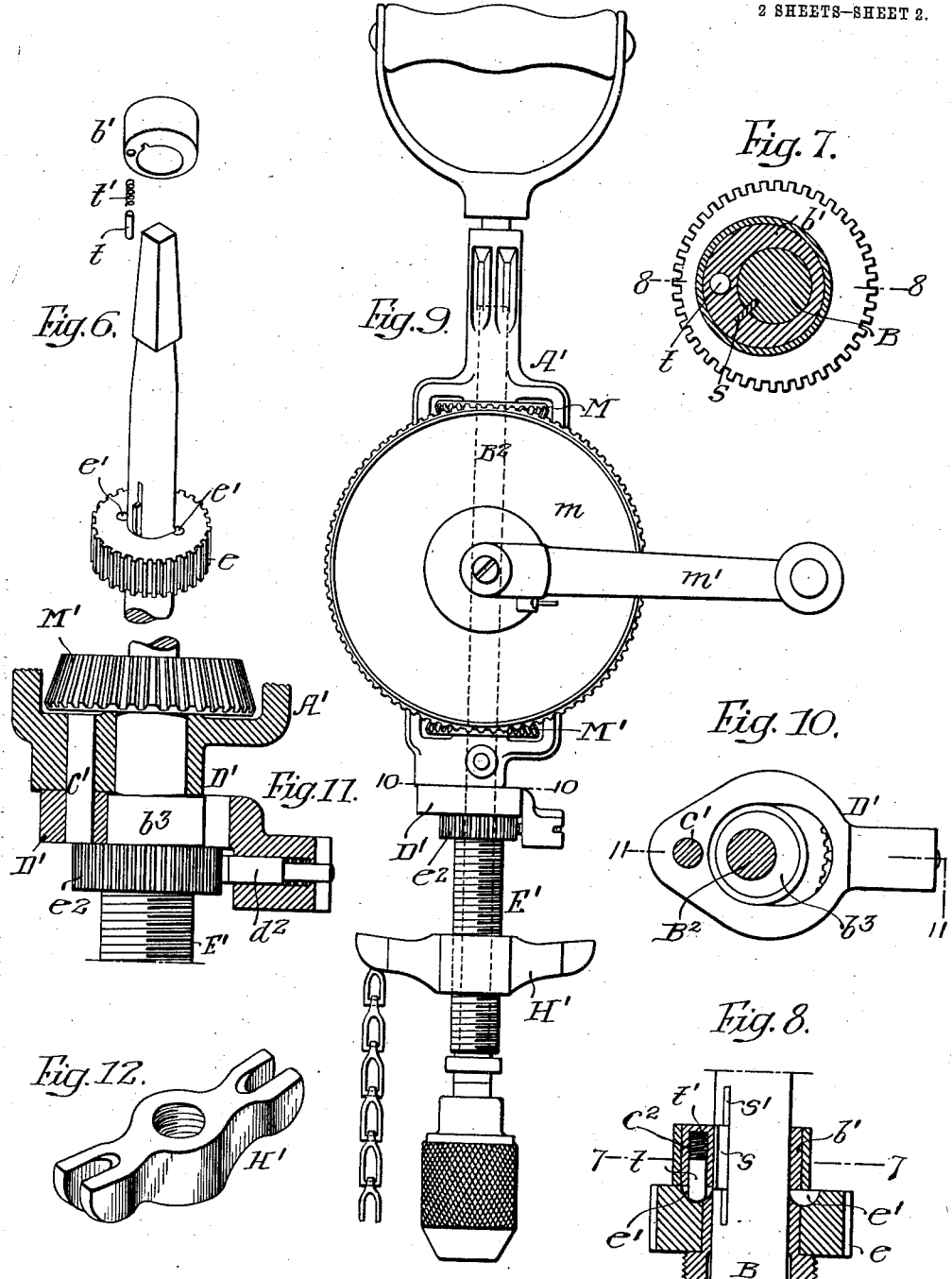

GEORGE O. LEOPOLD, OF PHILADELPHIA, PENNSYLVANIA, ASSIGNOR TO NORTH BRO'S M'F'G CO., OF PHILADELPHIA, PENNSYLVANIA, A CORPORATION OF PENNSYLVANIA.

CHAIN-DRILL.

1,034,258.  Specification of Letters Patent.  Patented July 30, 1912.

Application filed October 11, 1911. Serial No. 654,114.

*To all whom it may concern:*

Be it known that I, GEORGE O. LEOPOLD, a citizen of the United States, residing in Philadelphia, Pennsylvania, have invented certain Improvements in Chain-Drills, of which the following is a specification.

The main object of this invention is to improve the construction of drilling mechanisms in which a chain or its equivalent is used to hold the work to the drill, so that, on rotating the mechanism, the drill will be automatically fed to the work.

A further object of the invention is to provide means whereby the drill or other tool can be quickly adjusted to the work after the device is attached to the work by the chain.

The invention can be applied either to an ordinary brace, or to a breast drill, as desired.

In the accompanying drawings:—Figure 1, is a side view of the improved chain drill arranged to be used in connection with a brace; Fig. 2, is a view looking in the direction of the arrow, Fig. 1; Fig. 3, is a vertical sectional view on the line 3—3, Fig. 2; Fig. 4, is a sectional plan view on the line 4—4, Fig. 1; Fig. 5, is a perspective view of the chain grip; Fig. 6, is a perspective view of the spindle, showing the cam detached therefrom; Fig. 7, is an enlarged sectional plan view on the line 7—7, Fig. 8; Fig. 8, is a sectional view on the line 8—8, Fig. 7; Fig. 9, is a view in elevation, showing the invention applied to a breast drill; Fig. 10, is a sectional plan view on the line 10—10, Fig. 9; Fig. 11, is a sectional view on the line 11—11, Fig. 10; and Fig. 12, is a perspective view of the chain grip illustrated in Fig. 9.

Referring in the first instance to Figs. 1 to 8, inclusive, B is a spindle having at one end a chuck B' and at the opposite end, in the present instance, a quadrangular tapered shank $b$ adapted to fit the socket of a brace or other driver. A is a carrier mounted loosely on the spindle and held between a cam $b'$ and a collar $b^2$.

Depending from the carrier A is a pin $c$ on which is mounted a pawl piece D carrying a spring pawl $d$ which engages a ratchet wheel $e$ on the end of the hollow screw stem E which is mounted on the spindle B. This screw stem is held between the cam $b'$ and a collar $f$ on the spindle B, and this collar in turn rests on a shoulder. Between this collar and the end of the screw stem are balls $f'$, which form a ball thrust bearing. The lower portion of the spindle is enlarged as indicated in Fig. 3, and is threaded for the reception of the chuck B'.

Arranged to slide on the pin $c$ is a chain grip head H having a screw threaded opening $h$ for the passage of the threaded stem E. On each side of the grip head are notched arms arranged to engage the links of a chain of any suitable type. The chain is passed around the work and secured to the grip head in the ordinary manner.

By the above construction the grip head H can be moved intermittently by turning the spindle, as the cam $b'$ rests in an opening $d'$ in the pawl piece D and vibrates the pawl piece on its pin $c$ as the cam rotates. This movement causes the pawl to feed the ratchet wheel and its screw stem one tooth at a time, feeding the tool carried by the chuck to its work as it cuts the hole.

The pawl $d$ is mounted in the pawl piece so that it can be turned to feed right or left and the teeth of the ratchet wheel are made accordingly.

In order to quickly adjust the tool to the work after the chain has been applied, I attach the cam directly to the ratchet wheel by a slip connection, so that when the cam is turned it will carry the ratchet wheel with it, moving the hollow screw stem down to the work and, when the tool is in contact with the work, the slip connection will allow the cam to turn independently of the ratchet wheel, and then the ratchet wheel will be fed forward through the medium of the pawl and the pawl piece.

In the present instance, as clearly shown in Figs. 6, 7 and 8, I secure the cam $b'$ to the spindle B by a key $s$ adapted to a keyway $s'$ in the spindle, and in the cam is a socket $c^2$ in which is mounted a pin $t$, and back of the pin is a spring $t'$. The outer end of the pin is rounded and in the upper side of the ratchet wheel $e$ are rounded cavities $e'$, two in the present instance, into which the pin is projected by the spring.

Under normal conditions the ratchet wheel will be driven directly by the cam through this pin $t$ but, as before stated, when the tool reaches the work the friction will be sufficient to cause the cam to move independently of the sprocket wheel; the pin being forced back due to the resistance of the work, and then, as the tool cuts its way into the work, it will be fed forward through the medium of the pawl piece D and pawl $d$.

In Figs. 9 to 12, inclusive, I have shown the invention applied to a breast drill, in which A' is a carrier in the form of a frame having bearings for the spindle $B^2$ carrying a chuck at its lower end. On the spindle are two bevel pinions M, M', one fast and the other loose in the present instance, and meshing with the bevel pinions is a gear wheel $m$ having a handle $m'$. The loose pinion M acts as a balance wheel to prevent the straining of the large driving gear wheel $m$. D' is a pawl piece pivotally mounted on the pin $c'$, Fig. 11, and $d^2$ is a pawl which engages the ratchet wheel $e^2$ on the screw stem E', on which is mounted the chain grip head H' having arms to engage the chain, as shown in Figs. 9 and 12.

The pawl piece D' has an opening similar to the opening in the pawl piece D, for the reception of the cam $b^3$ on the spindle $B^2$.

By the above construction it will be seen that I am enabled to manufacture a very simple and effective breast drill of few parts, and in which the tool will be positively fed to the work, and in which the tool can be readily adjusted to the work after being clamped thereto.

I claim:—

1. The combination in a chain drill, of a spindle; means for turning said spindle; a screw stem; a ratchet wheel secured to said stem; a carrier having a pin; a pawl piece pivotally mounted on said pin and spanning the spindle; a pawl mounted in the pawl piece and engaging the ratchet wheel; a cam secured to the spindle and arranged to actuate the pawl piece; with a slip connection between the spindle and the ratchet wheel.

2. The combination of a spindle; means for turning the spindle; a carrier in which the spindle is mounted; said carrier having a pin at one side of the spindle; a screw stem on the spindle; a ratchet wheel secured to the stem; a pawl piece mounted on the pin of the carrier and spanning the spindle; a cam secured to the spindle and located between the arms of the pawl piece; a pawl on the pawl piece engaging the ratchet wheel; a grip head having a threaded opening engaging the screw stem; and a chain engaging the head and adapted to pass around the work.

3. The combination of a spindle; a carrier in which the spindle is mounted; a pin projecting from the carrier; a pawl piece pivotally mounted on the pin and spanning the spindle; a cam secured to the spindle and located within the pawl piece so that as the cam is turned the pawl piece will be actuated; a screw stem mounted on the spindle; a ratchet wheel secured to the screw stem; a pawl on the pawl piece arranged to engage the ratchet wheel, said ratchet wheel having a recess in one face; a pin mounted in the cam and arranged to couple the cam directly to the ratchet wheel so that the ratchet wheel and its screw stem will turn with the cam and its spindle until the resistance is sufficient to cause the pin to slip out of the recess, when the screw stem will be turned through the medium of the pawl and ratchet.

In testimony whereof, I have signed my name to this specification, in the presence of two subscribing witnesses.

GEORGE O. LEOPOLD.

Witnesses:
 WM. E. SHUPE,
 WM. A. BARR.